US009421673B2

(12) United States Patent
Dunmire

(10) Patent No.: US 9,421,673 B2
(45) Date of Patent: Aug. 23, 2016

(54) HELICOPTER ROTOR BLADE CLAMP

(71) Applicant: Davis Aircraft Products Co., Inc., Bohemia, NY (US)

(72) Inventor: Daniel F. Dunmire, Stony Brook, NY (US)

(73) Assignee: DAVIS AIRCRAFT PRODUCTS CO., INC., Bohemia, NY (US)

( * ) Notice: Subject to any disclaimer, the term of this patent is extended or adjusted under 35 U.S.C. 154(b) by 36 days.

(21) Appl. No.: 14/613,068

(22) Filed: Feb. 3, 2015

(65) Prior Publication Data
US 2015/0225077 A1 Aug. 13, 2015

Related U.S. Application Data

(60) Provisional application No. 61/937,687, filed on Feb. 10, 2014.

(51) Int. Cl.
*B25B 5/14* (2006.01)
*B64C 27/00* (2006.01)
*B64C 27/50* (2006.01)
*B64C 27/32* (2006.01)
*B64C 3/56* (2006.01)
*B64F 1/12* (2006.01)

(52) U.S. Cl.
CPC ... *B25B 5/14* (2013.01); *B64C 3/56* (2013.01); *B64C 27/006* (2013.01); *B64C 27/32* (2013.01); *B64C 27/322* (2013.01); *B64C 27/50* (2013.01); *B64F 1/125* (2013.01)

(58) Field of Classification Search
CPC .......... B25B 5/14; B64C 27/50; B64C 27/32; B64C 27/322; B64C 27/006; B64C 3/56
USPC ................. 248/229.13, 229.23, 228.4, 230.4, 248/231.51, 316.5, 276.1, 288.11, 613, 248/614; 244/17.11
See application file for complete search history.

(56) References Cited

U.S. PATENT DOCUMENTS

| 2,986,422 | A | * | 5/1961 | Renfroc | B66C 1/48 294/101 |
|---|---|---|---|---|---|
| 3,133,715 | A | * | 5/1964 | Grunfelder | B64C 27/50 244/17.11 |
| 4,301,982 | A | | 11/1981 | Tiemann | |
| 4,623,300 | A | * | 11/1986 | Ruzicka | B64C 27/50 244/7 A |
| 4,818,004 | A | * | 4/1989 | Oswalt | B66C 1/24 294/67.21 |
| 4,821,990 | A | * | 4/1989 | Porter | F16M 13/02 248/231.51 |
| 5,211,538 | A | * | 5/1993 | Seghal | B64C 27/50 244/17.11 |
| 5,772,269 | A | * | 6/1998 | Henning, Jr. | B66C 1/18 294/67.22 |
| 6,568,644 | B2 | * | 5/2003 | Pedersen | B62J 7/08 224/309 |
| 6,681,971 | B2 | * | 1/2004 | Laverack | B60R 9/045 224/319 |

(Continued)

*Primary Examiner* — Eret McNichols
(74) *Attorney, Agent, or Firm* — Law Offices of Michael L. Wise, LLC

(57) ABSTRACT

An apparatus comprises frame plates, lever arms, a linkage assembly, bridge arms, upper pad assemblies, and lower pad assemblies. The lever arms are operative to pivot relative to the frame plates. The linkage assembly is pivotally coupled to the frame plates and to the lever arms. The bridge arms are pivotally coupled to the lever arms. The upper pad assemblies are pivotally coupled to the bridge arms. Lastly, the lower pad assemblies are pivotally coupled to the frame plates. Pivoting the lever arms in a first direction translates the upper pad assemblies towards the lower pad assemblies, and pivoting the lever arms in a second direction translates the upper pad assemblies away from the lower pad assemblies. Actuation of the linkage assembly is operative to cause the lever arms to pivot.

20 Claims, 9 Drawing Sheets

(56) References Cited

U.S. PATENT DOCUMENTS

| | | | | |
|---|---|---|---|---|
| 6,769,644 B2* | 8/2004 | Muylaert | ............... | B64C 27/50 244/17.11 |
| 6,793,186 B2* | 9/2004 | Pedersen | ............... | B60R 9/048 224/309 |
| 7,207,519 B2* | 4/2007 | Hoynash | ............... | B64C 27/50 244/17.11 |
| 7,980,522 B2* | 7/2011 | Anderson | ............... | B25B 5/14 244/17.11 |
| 8,783,636 B2* | 7/2014 | Okita | ............... | F16M 11/041 24/303 |
| 9,285,068 B2* | 3/2016 | Phelan | ............... | F16M 9/00 |
| 2011/0284327 A1* | 11/2011 | Crayton | ............... | F03D 1/003 182/150 |

* cited by examiner

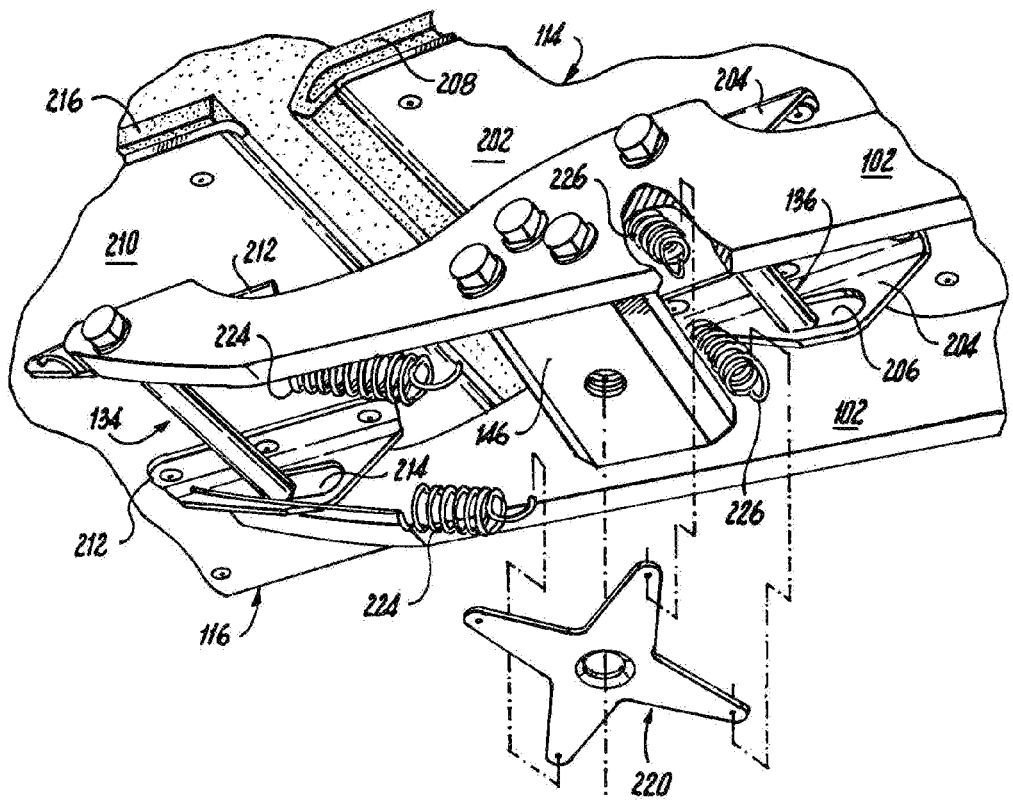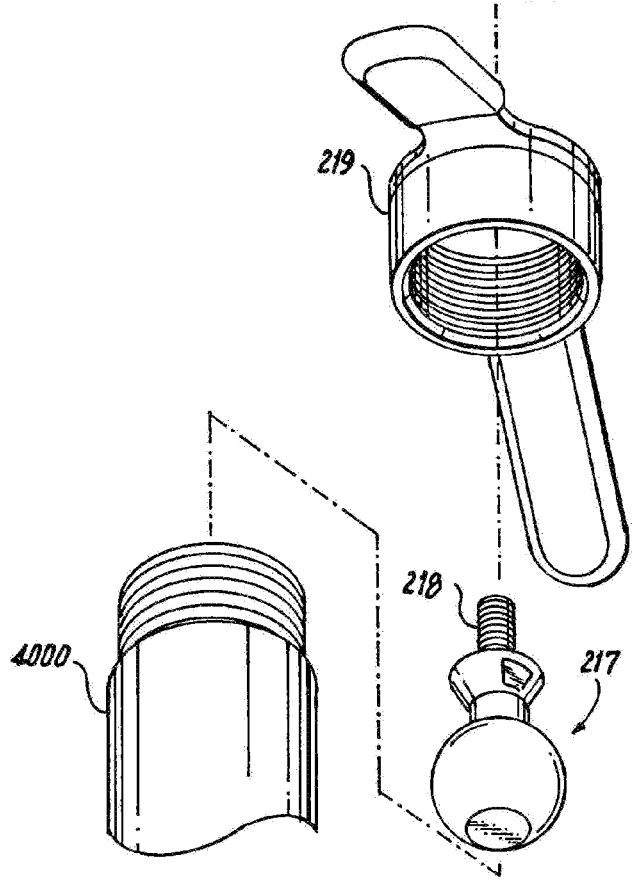
Fig. 6 though they may be damaged. Lastly, some helicopters have folding rotor blades that, when properly secured, make the helicopter substantially more compact for storage and shipment.

HELICOPTER ROTOR BLADE CLAMP

FIELD OF THE INVENTION

The present invention relates generally to clamping devices, and, more particularly, to clamping devices for use in immobilizing objects such as helicopter rotor blades.

BACKGROUND OF THE INVENTION

It is frequently desirable to secure the rotor blades of a helicopter when that helicopter is not in use. Securing the rotor blades has several advantages. It protects the blades from swinging, rocking, and flexing, and thereby avoids excessive pressure on a helicopter's rotor shaft. In addition, it stops the blades from spinning in the wind and thereby reduces the chance that the blades will strike something and be damaged. Lastly, some helicopters have folding rotor blades that, when properly secured, make the helicopter substantially more compact for storage and shipment.

Specialized clamping devices have been developed for attaching to the rotor blades of helicopters. One such rotor blade clamping device is described in U.S. Pat. No. 4,301,982 to Tiemann and entitled "Aircraft Blade Clamp." Once in place, these clamping devices may be mated to rigid pole assemblies (i.e., booms) or straps that act to restrict the movement of the rotor blades. Nevertheless, despite their widespread use, conventional rotor blade clamping devices are not ideal. They tend, for example, to be specific to one blade profile and therefore cannot be used on more than one type of helicopter. Moreover, a conventional rotor blade clamping device may place excessive force onto a rotor blade and cause damage. Such damage is of particular concern for rotor blades formed from composite materials such as carbon fiber, which are susceptible to cracking For the foregoing reasons, there is a need for improved rotor blade clamping devices that address the above-identified deficiencies.

SUMMARY OF THE INVENTION

Embodiments of the present invention address the above-identified needs by providing rotor blade clamping devices that are universal to several different rotor blade designs, and provide an even distribution of pressure that avoids damage.

Aspects of the invention are directed to an apparatus comprising a pair of frame plates, a pair of lever arms, a linkage assembly, a pair of bridge arms, a pair of upper pad assemblies, and a pair of lower pad assemblies. The pair of frame plates are spaced apart from one another. The pair of lever arms are also spaced apart from one another and are operative to pivot relative to the pair of frame plates about a pivot axis. The linkage assembly is pivotally coupled to the pair of frame plates and to the pair of lever arms. The pair of bridge arms are spaced apart from one another and are pivotally coupled to the pair of lever arms. The pair of upper pad assemblies are pivotally coupled to the pair of bridge arms. Lastly, the pair of lower pad assemblies are pivotally coupled to the pair of frame plates. Pivoting the pair of lever arms in a first direction about the pivot axis translates the pair of upper pad assemblies towards the pair of lower pad assemblies, and pivoting the pair of lever arms in a second direction about the pivot axis translates the pair of upper pad assemblies away from the pair of lower pad assemblies. Actuation of the linkage assembly is operative to cause the pair of lever arms to pivot about the pivot axis.

BRIEF DESCRIPTION OF THE DRAWINGS

These and other features, aspects, and advantages of the present invention will become better understood with regard to the following description, appended claims, and accompanying drawings where:

FIG. 6 shows an exploded bottom perspective view of a portion of the FIG. 1 clamp;

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used in the present description and appended claims, two elements are "oriented substantially parallel" to one another if they are parallel within ten degrees. In addition, an element is "manually actuated" when that element can be actuated by a person of average strength with only his two hands. The term "proximate," when applied to an element characterized by a length, means within a distance less than 15% of that length. The terms "proximal" and "rearward" mean closer to a linkage assembly that actuates the apparatus, while "distal" and "forward" mean further from the linkage assembly. Lastly, the terms "lower," "below," "upper," and "above" are referenced to the manner in which the apparatus is oriented in the figures.

Figure 1:
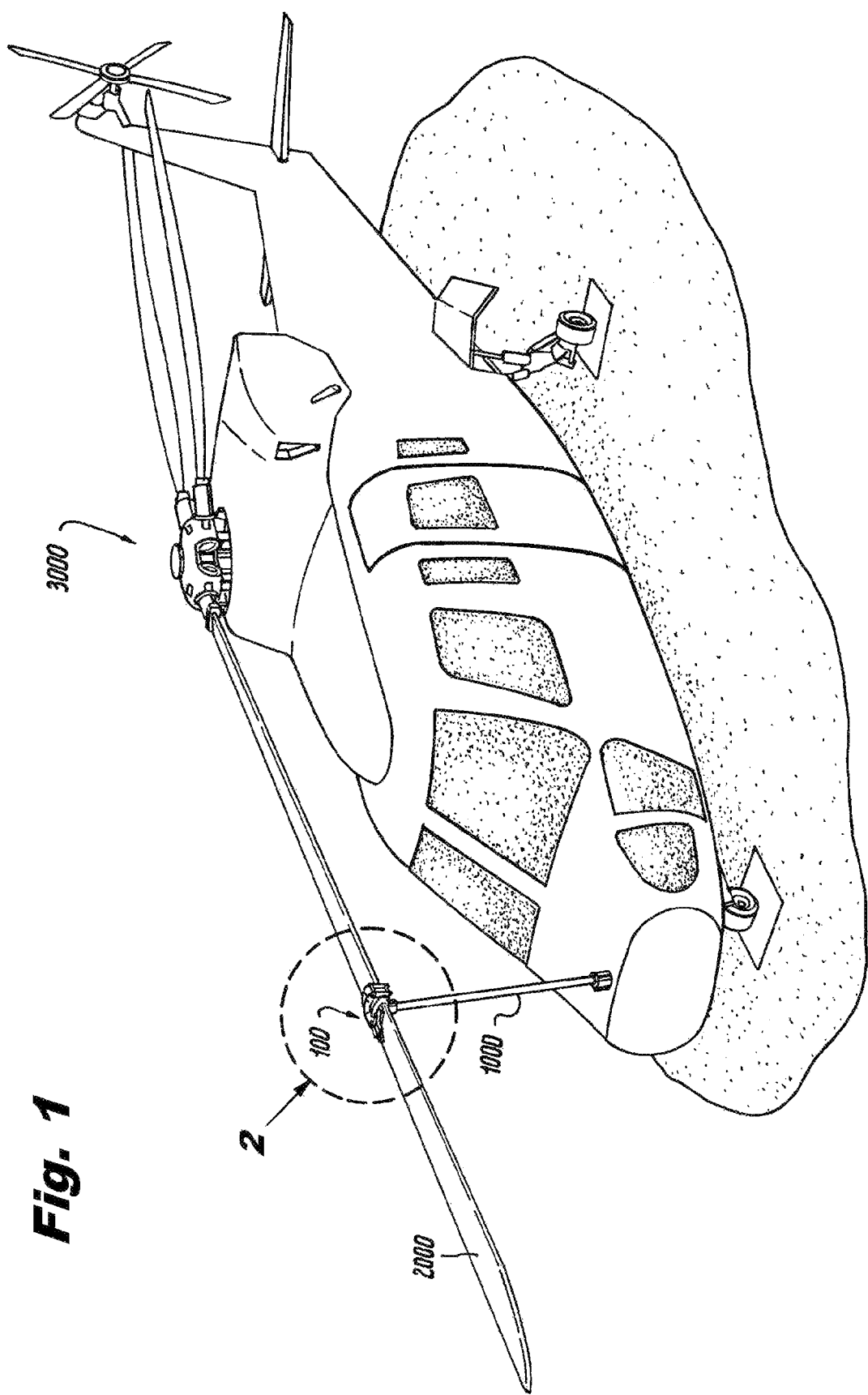
FIG. 1 shows a perspective view of a clamp in accordance with an illustrative embodiment of the invention affixed to a rotor blade of a helicopter.

The figures provided herein teach aspects of a clamp 100 in accordance with an illustrative embodiment of the invention. It is contemplated that the clamp 100, once placed on a rotor blade of a helicopter, can be further fixated to a rigid pole assembly or strap. Such a configuration is shown in FIG. 1, which shows a perspective view of the clamp 100 in combination with a rigid pole assembly 1000 being utilized to secure a rotor blade 2000 of a helicopter 3000. The combination of the clamp 100 and the rigid pole assembly 1000 act to restrict the motion of the rotor blade 2000 and reduce the chance of damage to the helicopter 3000 while the helicopter 3000 is being stored, transported, tied down, lifted, or the like.

Figure 2:
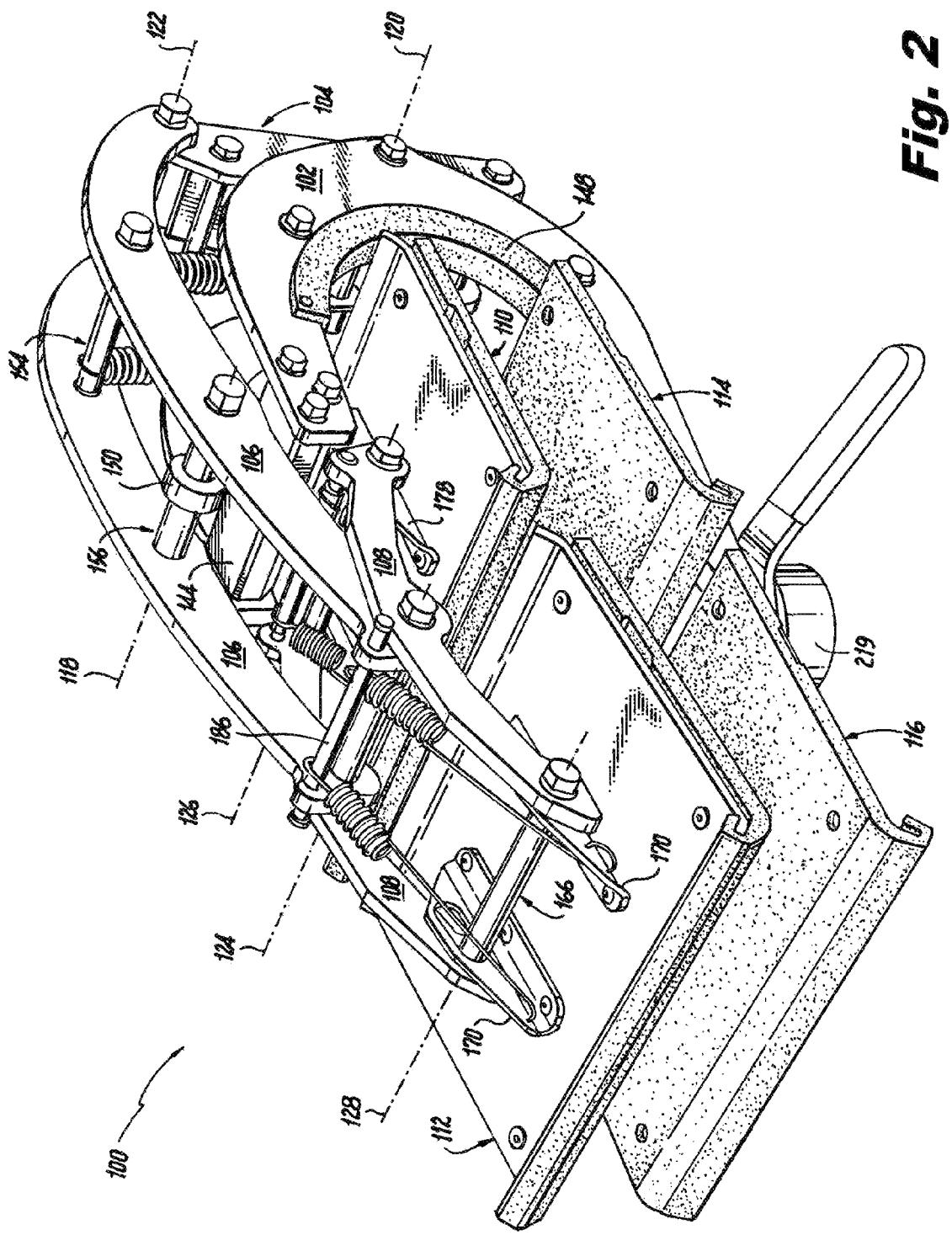
FIG. 2 shows a top perspective view of the FIG. 1 clamp.
Figure 3:
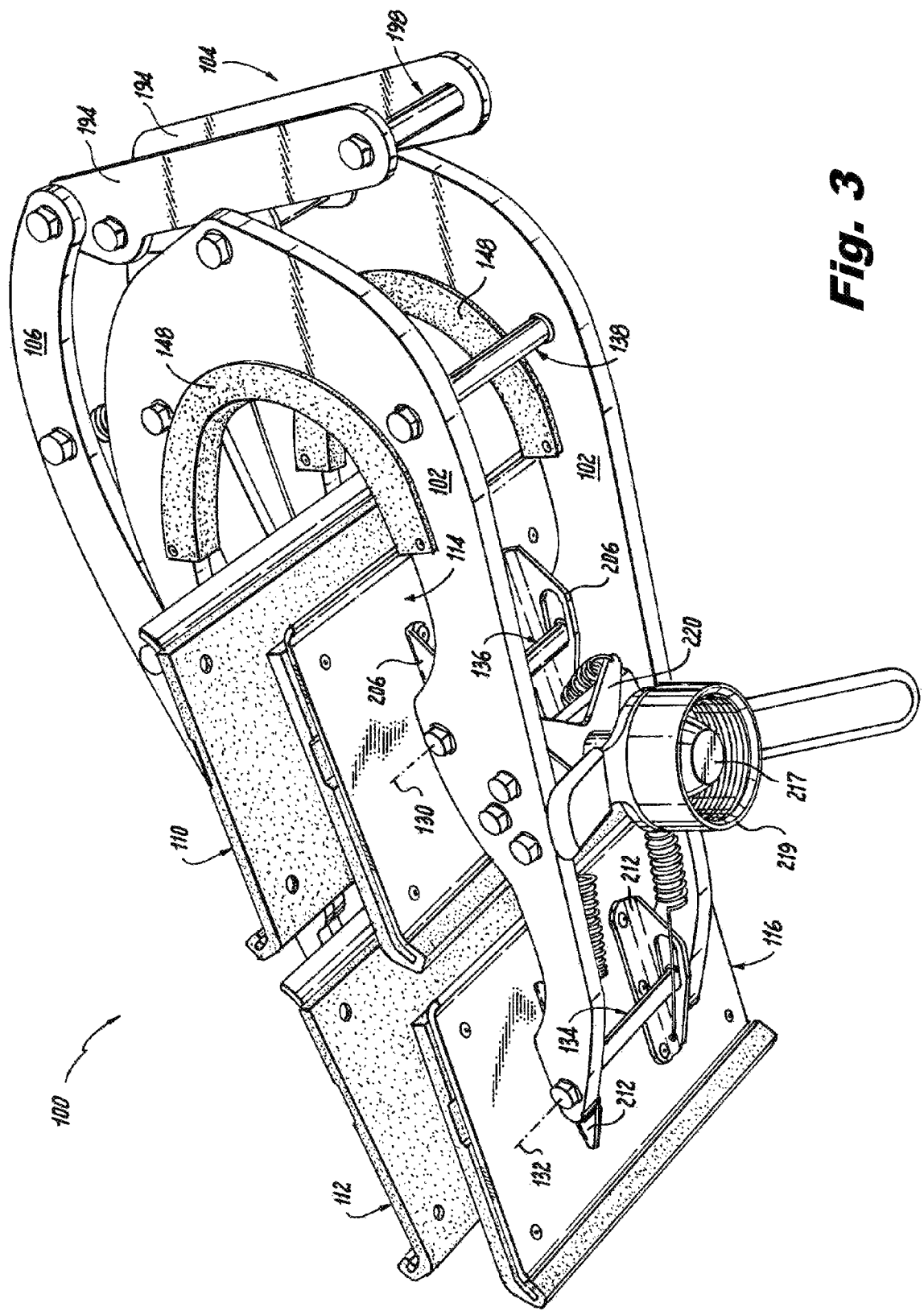
FIG. 3 shows a bottom perspective view of the FIG. 1 clamp.
Figure 4:
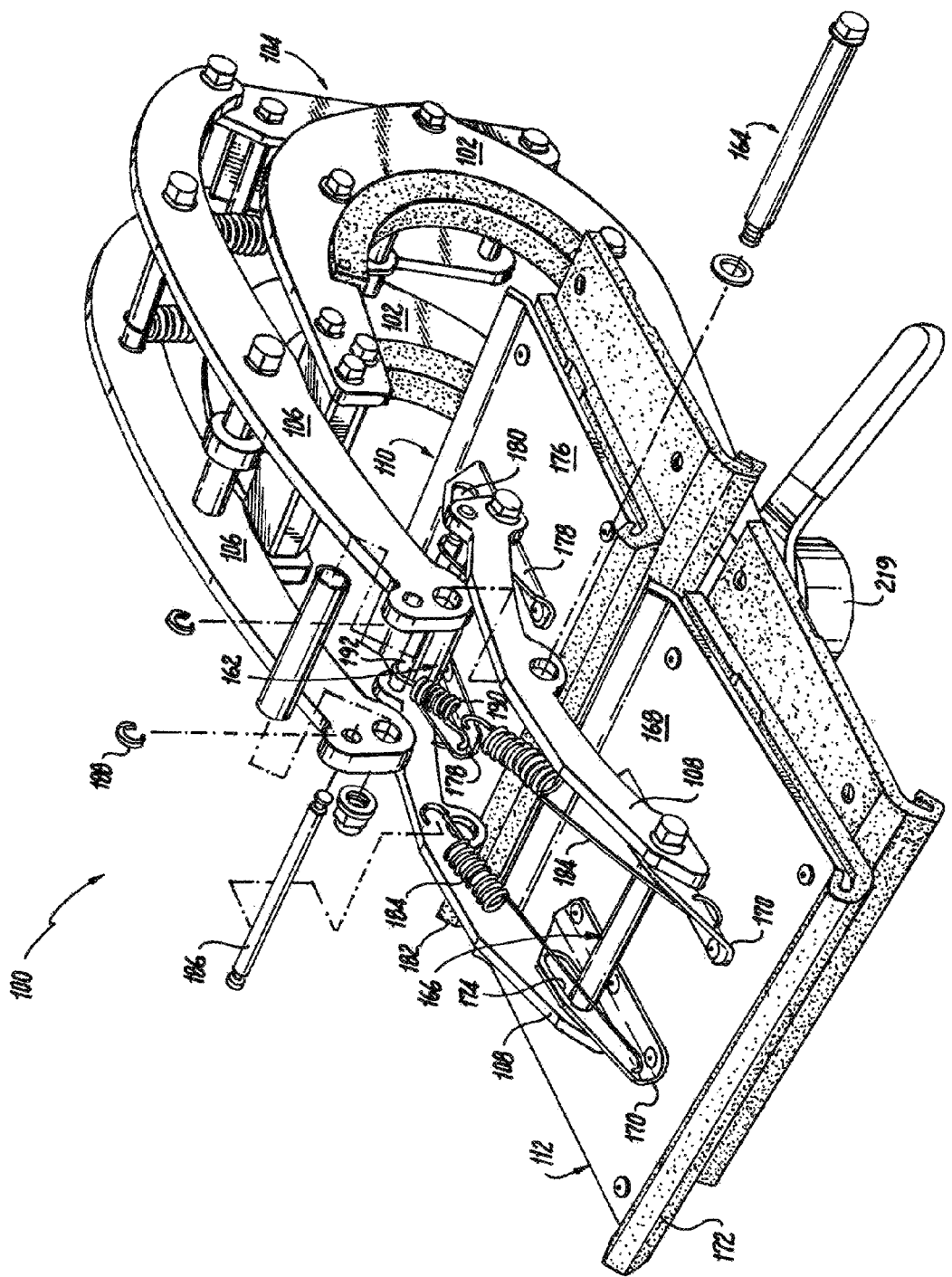
FIG. 4 shows an exploded top perspective view of the FIG. 1 clamp.
Figure 5:
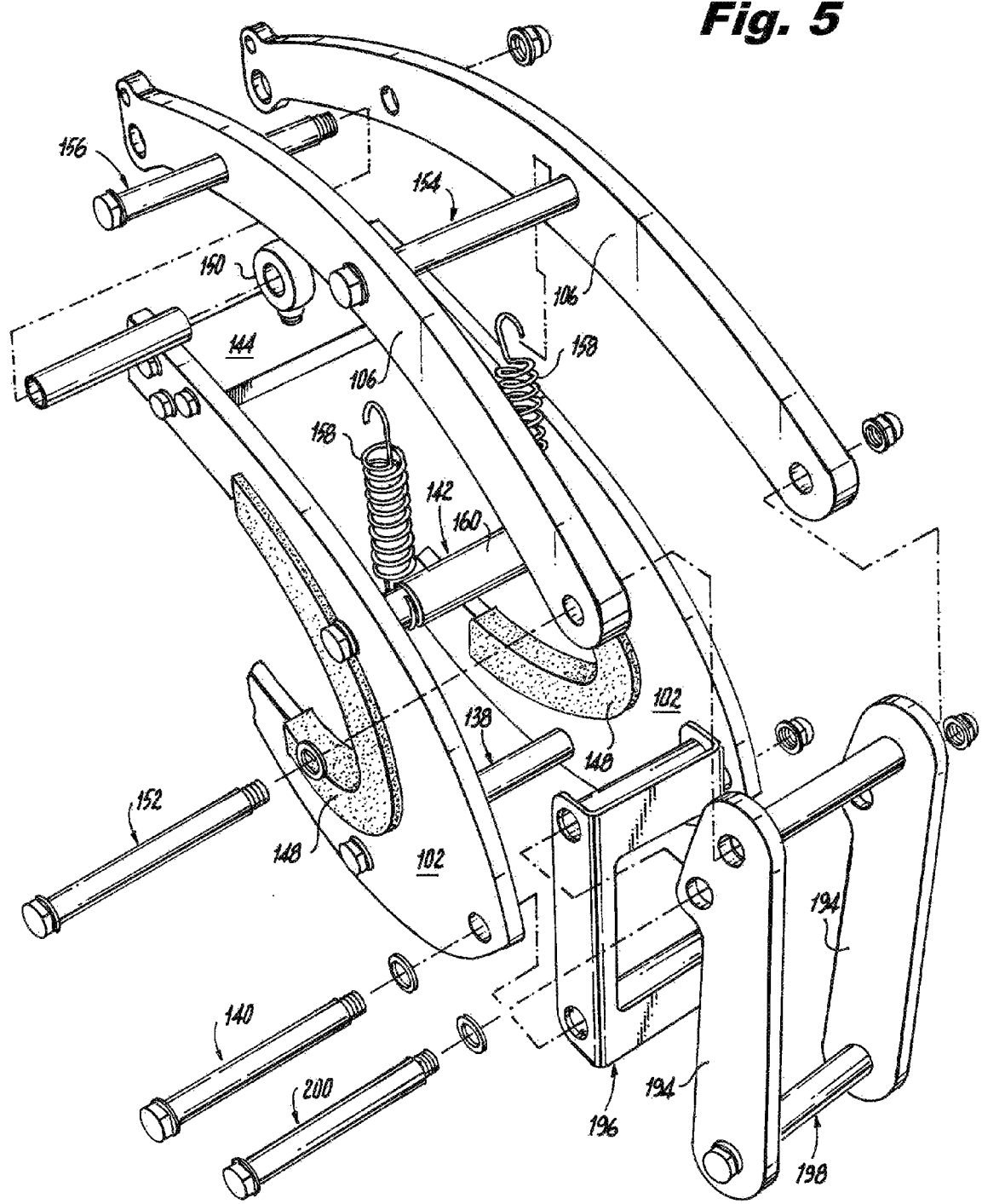
FIG. 5 shows an exploded rear perspective view of a portion of the FIG. 1 clamp.

FIGS. 2-6 show various views of the clamp 100. FIG. 2 shows a top perspective view, while FIG. 3 shows a bottom perspective view. FIGS. 4 and 5 show exploded top perspective views, and FIG. 6 shows an exploded bottom perspective view.

The clamp 100 comprises a pair of frame plates 102, a linkage assembly 104, a pair of lever arms 106, a pair of bridge arms 108, a proximal upper pad assembly 110, a distal upper pad assembly 112, a proximal lower pad assembly 114, and a distal lower pad assembly 116. Functionality of the clamp 100 is aided by numerous pivotal and translatable couplings between the various elements. The lever arms 106 are operative to pivot relative to the frame plates 102 about a first pivot axis 118. The linkage assembly 104 is pivotally coupled to the frame plates 102 about a second pivot axis 120, and is further pivotally coupled to proximal ends of the lever arms 106 about a third pivot axis 122. The bridge arms 108 are pivotally coupled to distal ends of the lever arms 106 about a fourth pivot axis 124. The proximal upper pad assembly 110 is pivotally and translatably coupled to the bridge arms 108 about a fifth pivot axis 126, and the distal upper pad assembly 112 is pivotally and translatably coupled to the bridge arms 108 about a sixth pivot axis 128. Lastly, the proximal lower pad assembly 114 is pivotally and translatably coupled to the frame plates 102 about a seventh pivot axis 130, and the distal lower pad assembly 116 is pivotally and translatably coupled to the frame plates 102 about an eighth pivot axis 132.

So configured, the clamp 100 is operative to clamp an object such as a helicopter rotor blade between the upper pad assemblies 110, 112 and the lower pad assemblies 114, 116. Pivoting the lever arms 106 in a first direction about the first pivot axis 118 translates the upper pad assemblies 110, 112 towards the lower pad assemblies 114, 116, and pivoting the lever arms 106 in a second direction about the first pivot axis 118 translates the upper pad assemblies 110, 112 away from the lower pad assemblies 114, 116. Actuation of the linkage assembly 104 is operative to cause lever arms 106 to pivot about the first pivot axis 118.

Additional details regarding the structure of the clamp 100 are now enumerated. Because many aspects of the invention are accomplished with bolts, cylindrical spacers, washers and nuts, the term "bolt-spacer assembly" is used hereinafter for economy of description. A bolt-spacer assembly consists of a bolt that is partially encircled by a cylindrical spacer and that is fixated in place by a nut and two or more washers. When ascribing a direction to a bolt-spacer assembly, it is the common longitudinal axis of the bolt and the cylindrical spacer that is referenced. Both bolts and cylindrical spacers are examples of "elongate members," as that term is used in the appended claims.

Still referring to FIGS. 2-6, the frame plates 102 run parallel to each other and are held in spaced relation by five bolt-spacer assemblies 134, 136, 138, 140, 142. An upper block 144 is disposed between the frame plates 102 immediately below the first pivot axis 118, while a lower block 146 is positioned between the frame plates 102 below the proximal lower pad assembly 114. A pair of elastomeric frame pads 148 run along the inside edges of each of the frame plates 102 where the frame plates 102 may come into contact with an object being clamped.

The upper block 144 helps to support the lever arms 106 so that the lever arms 106 may pivot about the first pivot axis 118. In the present non-limiting embodiment, the first pivot axis 118 is displaced from the frame plates 102 and does not extend through the frame plates 102. The displacement of the first pivot axis 118 is achieved by an eyebolt 150, which is screwed into the upper block 144. The lever arms 106 run parallel to each other and are held in spaced relation by three bolt-spacer assemblies 152, 154, 156. The bolt-spacer assembly 156 passes through the lever arms 106 and the eyebolt 150 along the first pivot axis 118.

A pair of lever springs 158 biases the lever arms 106 towards its open position. The lever springs 158 span between the bolt-spacer assembly 154 of the lever arms 106 and the bolt-spacer assembly 142 of the frame plates 102. The lever springs 158 urge the bolt-spacer assembly 154 towards the bolt spacer assembly 142. An additional spacer 160 helps to keep the lever springs 158 in proper spaced relation.

At distal ends of the lever arms 106, the bridge arms 108 are also spaced apart from each other and run parallel to each other. This spaced relation is maintained by three bolt-spacer assemblies 162, 164, 166. Pivotal coupling between the bridge arms 108 and the lever arms 106 is achieved by the bolt-spacer assembly 164, which passes through the bridge arms 108 near their centers and through the lever arms 106 along the fourth pivot axis 124.

The distal upper pad assembly 112 comprises a distal upper pad plate 168, a pair of distal upper pad mounting brackets 170, and a distal upper elastomeric pad 172. The distal upper pad mounting brackets 170 define a pair of distal upper slots 174. Pivotal and translational coupling of the distal upper pad assembly 112 to distal ends of the bridge arms 108 is via the bolt-spacer assembly 166, which passes through the bridge arms 108 and the distal upper slots 174 along the sixth pivot axis 128. The proximal upper pad assembly 110 is arranged in a similar fashion. It comprises a proximal upper pad plate 176, a pair of proximal upper pad mounting brackets 178 defining a pair of proximal upper slots 180, and a proximal upper elastomeric pad 182. Pivotal and translational coupling of the proximal upper pad assembly 110 is via the bolt-spacer assembly 162, which runs along the fifth pivot axis 126.

The clamp 100 utilizes springs to bias respective forward edges of the proximal and distal upper pad assemblies 110, 112 away from the proximal and distal lower pad assemblies 114, 116. This angles the proximal and distal upper pad assemblies 110, 112 to allow a rotor blade to be more easily inserted into the clamp 100 with the clamp 100 open. To bias the distal upper pad assembly 112, a pair of distal upper springs 184 span between respective forward ends of the distal upper pad mounting brackets 170 and a distal upper pin 186 that passes through the lever arms 106. The distal upper pin 186 spans between the lever arms 106 rearward of where the distal upper springs 184 mount to the distal upper pad mounting brackets 170, and is secured in place by a pair of distal upper retaining rings 188. To bias the proximal upper pad assembly 110, a pair of proximal upper springs 190 span between respective forward ends of the proximal upper pad mounting brackets 178 and a proximal upper pin 192 that spans between the bridge arms 108 rearward of where the proximal upper springs 190 attach to the proximal upper pad mounting brackets 178. The proximal upper pin 192 is also secured by its own set of retaining rings. It is noted that the upper pins 186, 192 are also examples of "elongate members," as that term is used in the appended claims.

The linkage assembly 104 comprises a pair of clamp lever arms 194 and a pivot plate 196. The clamp lever arms 194 run parallel to each other and are maintained in spaced relation by two bolt-spacer assemblies 198, 200. A lower end of the pivot plate 196 is pivotally coupled to the frame plates 102 via the bolt-spacer assembly 140 along the second pivot axis 120, while an upper end of the pivot plate 196 is pivotally fixated to first points on the clamp lever arms 194 via the bolt-spacer assembly 200. Second points on the clamp lever arms 194 are pivotally coupled to the lever arms 106 via the bolt-spacer assembly 152 running along the third pivot axis 122. The clamp lever arms 194 thereby form a short link in the linkage assembly 104 as well as a handle by which the linkage assembly 104 may be manually actuated by a user.

The proximal and distal lower pad assemblies 114, 116 are similar to the distal and proximal upper pad assemblies 110, 112. The proximal lower pad assembly 114 comprises a proximal lower pad plate 202, a pair of proximal lower pad mounting brackets 204 defining a pair of proximal lower slots 206, and a proximal lower elastomeric pad 208. The distal lower pad assembly 116 comprises a distal lower pad plate 210, a pair of distal lower pad mounting brackets 212 defining a pair of proximal lower slots 214, and a distal lower elastomeric pad 216. Bolt-spacer assemblies 134, 136 pass through the proximal and distal lower slots 206, 214 to affect the pivotal and translational coupling of the lower pad assemblies 114, 116 to the frame plates 102.

To facilitate connection of the clamp 100 to a pole or strap, a ball 217 with a threaded shaft 218, and a threaded receiver 219 are fixated to the remainder of the clamp 100 by having the threaded shaft 218 pass through the threaded receiver 219 and threadably engage the lower block 146. The ball 217 and threaded receiver 219 thereby form an interface for the clamp 100 that allows the clamp 100 to be further fixated to complementary sockets of rigid pole assemblies or straps (where a rigid pole assembly 4000 is shown in FIG. 6). The threaded receiver 219 may rotate somewhat on the ball 217 to allow the clamp 100 to take on different orientations relative to the rigid pole assembly 4000.

At the same time, the threaded shaft 218 also attaches an x-shaped spring attachment plate 220 against the lower block 146. The spring attachment plate 220 is utilized as an anchor for springs that bias forward edges of the proximal and distal lower pad assemblies 114, 116 away from the proximal and distal upper pad assemblies 110, 112. To bias the distal lower pad assembly 116, a pair of distal lower springs 224 span between respective forward ends of the distal lower pad mounting brackets 212 and respective points on the spring attachment plate 220 that are rearward of where the distal lower springs 224 attach to the distal lower pad mounting brackets 212. Similarly, to bias the proximal lower pad assembly 114, a pair of proximal lower springs 226 span between respective forward ends of the proximal lower pad mounting brackets 204 and respective points on the spring attachment plate 220 that are rearward of where the proximal lower springs 226 attach to the proximal lower pad mounting brackets 204.

Figure 7:
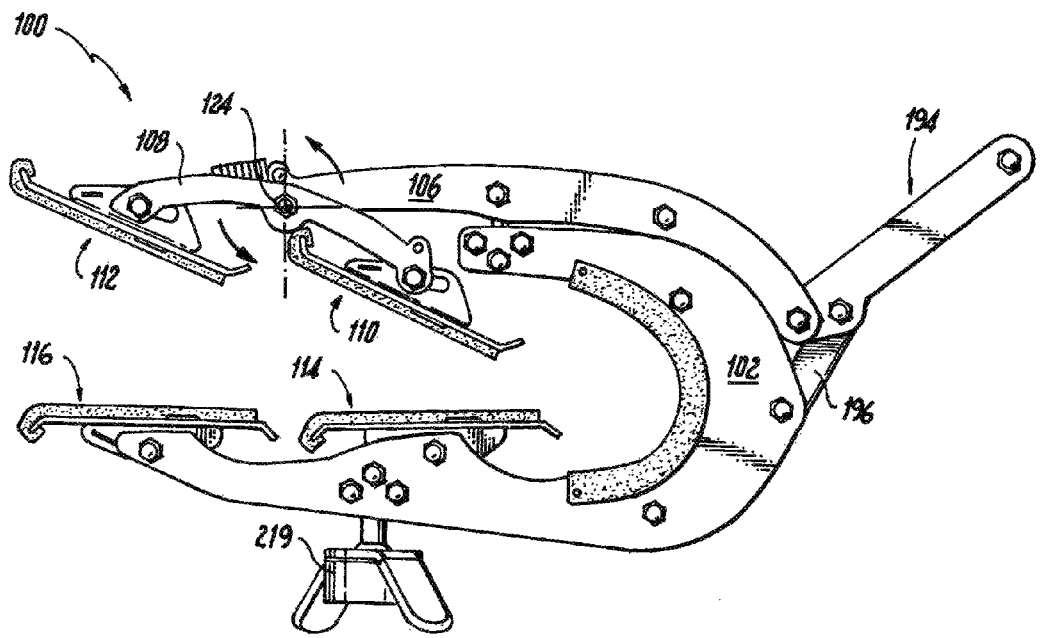
FIGS. 7 and 8 show side elevational views of the FIG. 1 clamp.

The functioning of the clamp 100 is now further detailed with reference to FIGS. 7-13. FIG. 7 shows a side elevational view of the clamp 100 in an open condition, which may be compared to the closed condition shown in FIGS. 2 and 3. To open the clamp 100, clamp lever arms 194 in the linkage assembly 104 are swung outward and upward (i.e., counter-clockwise in FIG. 7) to assume the position shown in FIG. 7. This has the effect of causing the lever arms 106 to pivot clockwise about the first pivot axis 118 and to thereby lift the upper pad assemblies 110, 112 away from the lower pad assemblies 114, 116. Room to accept a rotor blade is thereby created between the upper pad assemblies 110, 112 and the lower pad assemblies 114, 116. The opposite effect is obtained by swinging the clamp lever arms 194 downward and clockwise to obtain a closed condition. Doing so causes the lever arms 106 to pivot counter-clockwise about the first pivot axis 118 and to translate the upper pad assemblies 110, 112 towards the lower pad assemblies 114, 116. The rotor blade may thereby be clamped between the upper and lower pad assemblies 110, 112, 114, 116.

At the same time, the many pivotal and translatable couplings between the different elements in the clamp 100 allow the clamp 100 to conform to rotor blades with differing profiles, while the presence of the four pad assemblies 110, 112, 114, 116 acts to distribute the compressive pressure over a relatively large area of each rotor blade's surface. Distribution of contact loads over greater area reduces the applied pressure at any given spot on a captured rotor blade, which is of particular benefit when using the clamp 100 with helicopter rotor blades of composite construction that may be susceptible to damage from compressive loads. The illustrative clamp 100 and, more generally, embodiments in accordance with aspects of the invention, therefore provide several advantages over current clamp designs having single upper and lower non-articulating pads that only match the profile of a single rotor blade.

Figure 8:
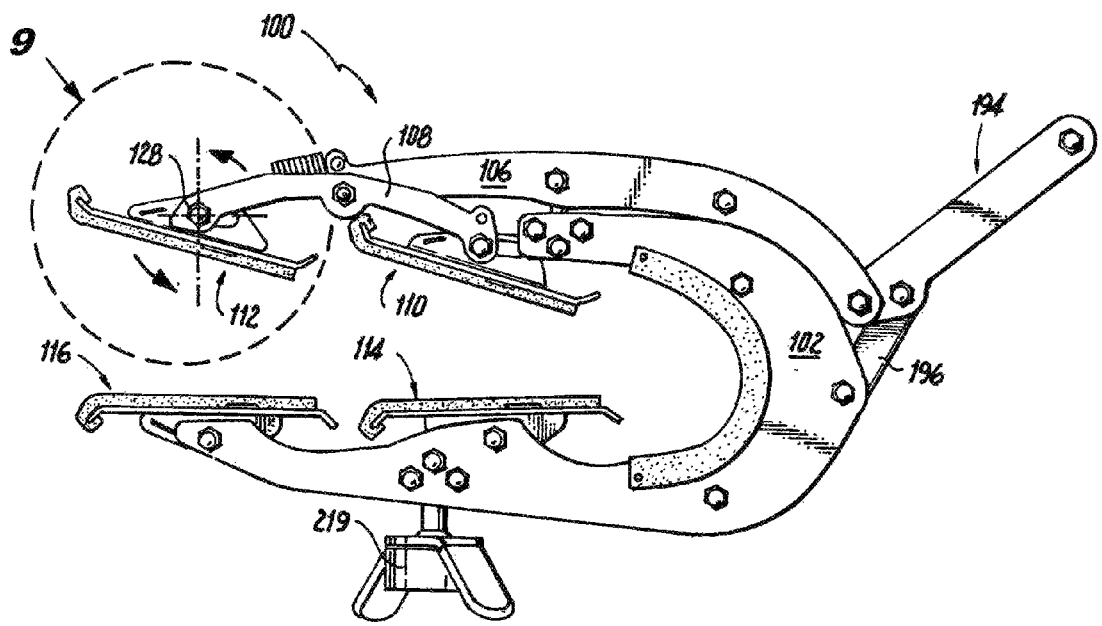
Figure 9:
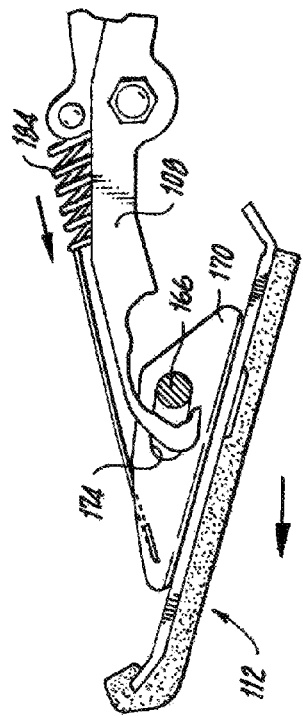
FIGS. 9 and 10 show magnified, partially broken side elevational views of the region of the FIG. 1 clamp indicated in FIG. 8.
Figure 10:
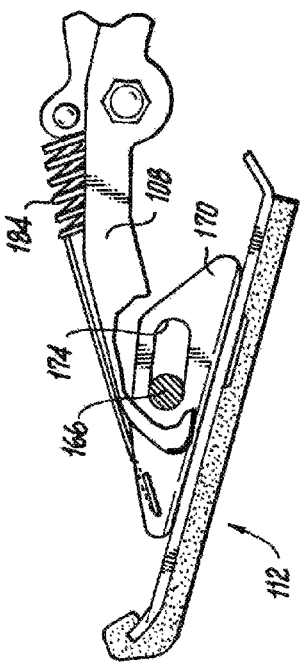

FIGS. 7-10 illustrate the several allowed relative motions within the clamp 100 that aid in making the clamp 100 universal to several different rotor blade profiles as well as in providing the uniform pressure distributions. FIG. 7 (introduced above) highlights the pivotal motion of the bridge arms 108 in relation to the lever arms 106 about the fourth pivot axis 124. FIG. 8, another side elevational view of the clamp 100, highlights the pivotal motion of the distal upper pad assembly 112 in relation to the bridge arms 108 about the sixth pivot axis 128. Lastly, FIGS. 9 and 10, magnified, partially broken side elevational views of the region indicated in FIG. 8, highlight the translational motion of the distal upper pad assembly 112 relative to the bridge arms 108. The proximal upper pad assembly 110, the proximal lower pad assembly 114, and the distal lower pad assembly 116 have similar pivotal and translational degrees of motion.

Again referring to FIG. 7, it will be noted that, when the clamp 100 is open, the proximal and distal upper springs 184, 190 urge the forward edges of the upper pad assemblies 110, 112 upward, while the proximal and distal lower springs 224, 226 urge the forward edges of the lower pad assemblies 114, 116 downward. This aids in placing the pad assemblies 110, 112, 114, 116 out of the way while a rotor blade is inserted into the open clamp 100.

Figure 11:
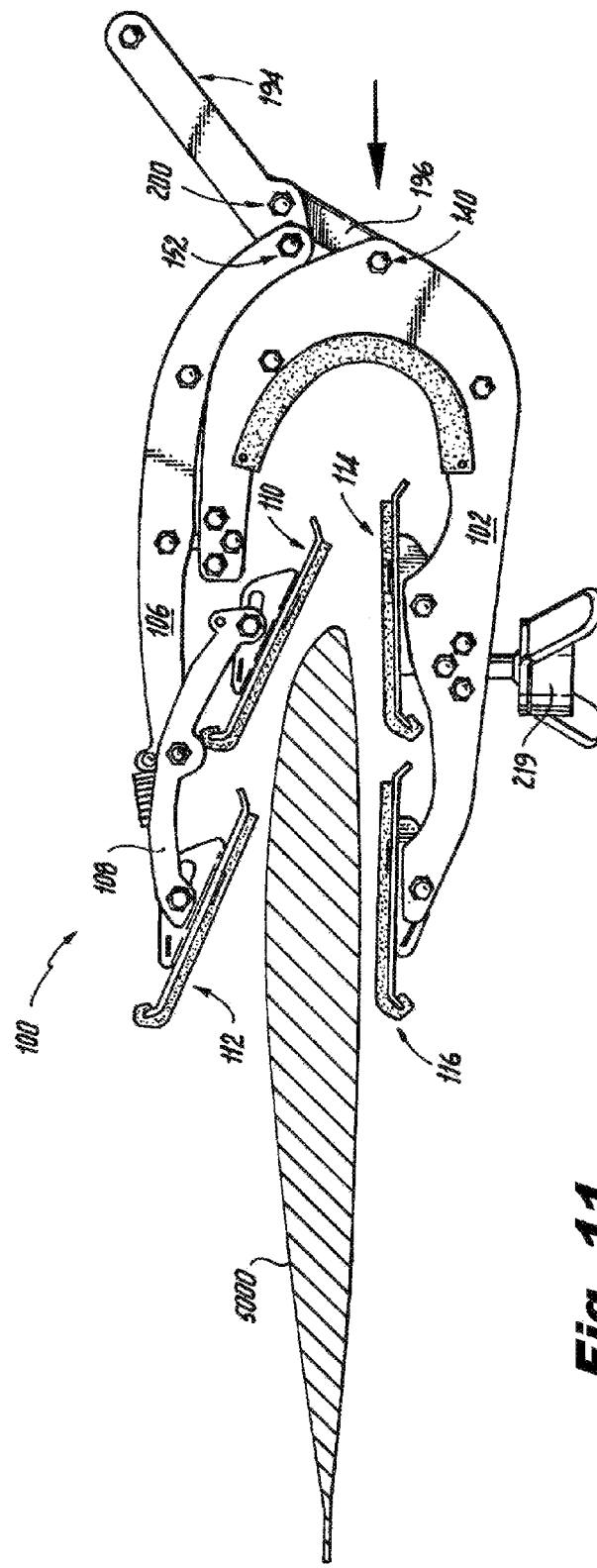
FIGS. 11-13 show side elevational views of the FIG. 1 clamp receiving a helicopter rotor blade.
Figure 12:
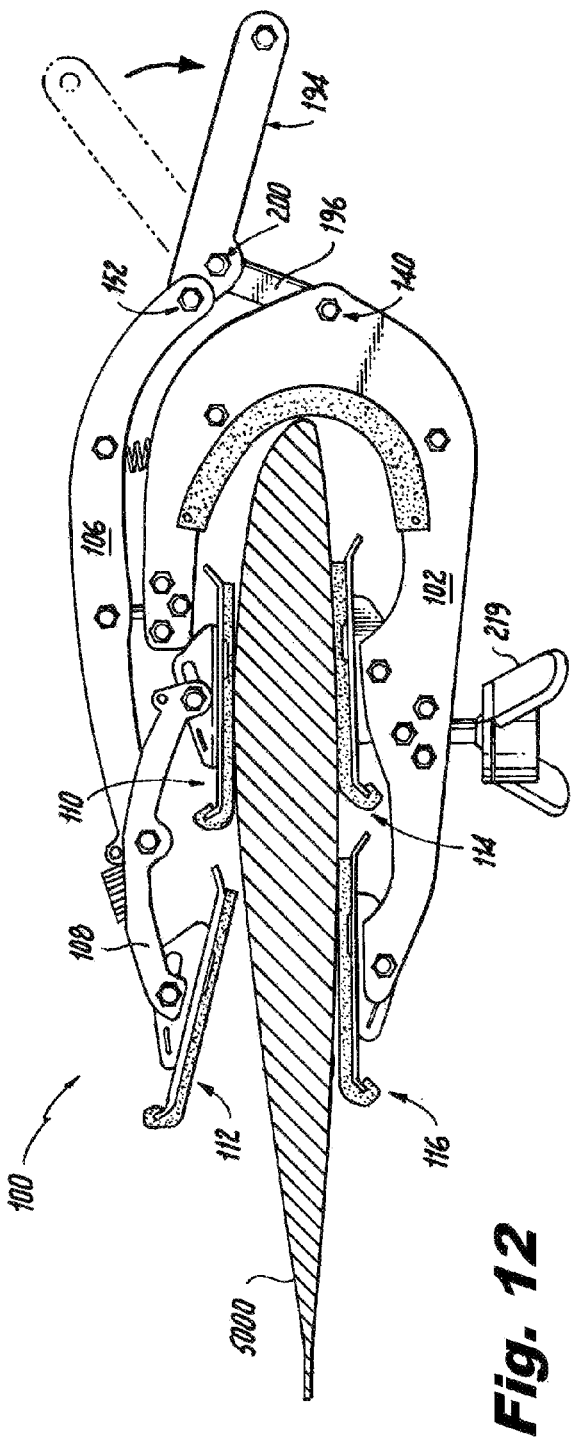
Figure 13:
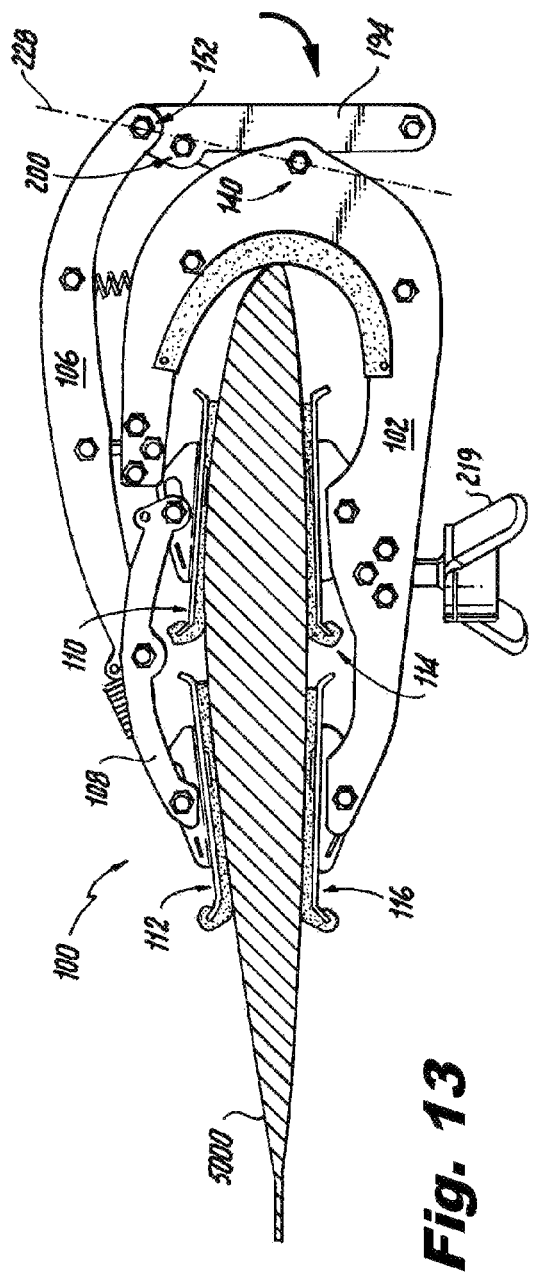

FIGS. 11-13 show side elevational views of the clamp 100 at various stages of closing on a helicopter rotor blade 5000 in response to actuation of the linkage assembly 104. From these figures, it may be observed how the bridge arms 108 and the upper and lower pad assemblies 110, 112, 114, 116 conform to the shape of the rotor blade 5000. The bridge arms 108, in particular, react to evenly divide the clamping up-force between the upper pad assemblies 110, 112. The clamp 100 may clamp a rotor blade of a substantially different profile with little or no adjustment. If an adjustment to the clamping force is desired, it may be accomplished by simply removing the bolt-spacer assembly 156 that passes through the eyebolt 150 and then rotating the eyebolt 150 one way or the other to change the extent by which the eyebolt 150 is screwed into the upper block 144. Once the desired position is achieved, the bolt-spacer assembly 156 may be reinserted through the eyebolt 150.

In the present embodiment, the linkage assembly 104 is operative to toggle or to positively lock the upper pad assemblies 110, 112 relative to the lower pad assemblies 114, 116 with the helicopter rotor blade 5000 clamped therebetween. Just as the clamp 100 reaches its closed condition, the clamp lever arms 194 pass a toggle position where they fold and lock, as shown in FIG. 13. That is, the linkage assembly 104 can be actuated so as to positively lock positions of the upper pad assemblies 110, 112 relative to the lower pad assemblies 114, 116 with the rotor blade 5000 clamped therebetween.

The toggled or positively locked position of the clamp 100 is achieved by having the bolt-spacer assembly 200 cross a centerline 228 connecting the bolt-spacer assembly 140 and the bolt-spacer assembly 152. As the centerline 228 is crossed, high mechanical advantage provided by the clamp lever arms 194 causes the various linkages in the linkage assembly 104 to deform just enough to allow the linkage assembly 104 to achieve the "over center" locked condition.

The lever springs 158 bias the lever arms 106 so as to aid in opening the clamp 100, and help to maintain the clamp 100 in the open condition once so placed.

Once clamped about a rotor blade, the interface portion of the clamp 100 allows the clamp 100 to be fixated to a conventional rigid pole assembly or strap, as shown in FIGS. 1 and 6. Suitable rigid pole assemblies are commercially available for several helicopter variants from, for example, Davis Aircraft Products Co, Inc. (Bohemia, N.Y., USA).

The clamp 100 may comprise metal and polymeric materials. Those parts that directly come into contact with a rotor blade, such as the elastomeric pads 148, 172, 182, 208, 216, are preferably formed of a soft elastomer such as, but not limited to, silicone rubber, isoprene rubber, butyl rubber, and nitrile rubber. The metal parts may comprise metals such as, but not limited, to aluminum and steel.

Once understood from the teachings provided herein, the various parts of the clamp 100 may be commercially sourced or formed by conventional manufacturing techniques utilizing commercially available tooling. For custom parts made of metal, the parts may be formed by metal manufacturing techniques such as, for example, forging, casting, machining, and forming. One or more of the metal parts may also be painted or powder-coated to aid with corrosion resistance and durability. Polymeric components may be manufactured by polymer manufacturing techniques such as, for example, extrusion and injection molding. These metal and polymer manufacturing techniques and others falling within the scope of the invention will already be familiar to one having ordinary skill in the relevant arts. Reference is also made to: E. P. Degarmo's Materials and Processes in Manufacturing, John Wiley & Sons, 2011, which is hereby incorporated by reference herein.

In actual reduction to practice, a working prototype clamp like that described herein had a weight of about ten pounds and functioned to securely, but gently, hold a composite rotor blade portion from an Apache AH-64 Helicopter.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

For example, one skilled in the art will recognize alternative means of pivotally coupling elements to one another to achieve the desired functionality. While the above-described embodiment utilizes bolts and cylindrical spacers secured with nuts, alternative embodiments could utilize different types of elongate members such as unthreaded pins secured with retaining rings or cotter pins, or partially or fully threaded rods secured with pairs of nuts. At the same time, in many instances, the inboard/outboard positioning of elements with respect to one another could be easily altered with little effect on ultimate functionality. Even other embodiments in accordance with aspects of the invention could utilize a different number of pad assemblies from that described above. An alternative embodiment could utilize, for example, three upper pad assemblies and three lower pad assemblies (for a total of six).

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. §112(f). In particular, the use of "step of" in the claims herein is not intended to invoke the provisions of AIA 35 U.S.C. §112(f).

What is claimed is:

1. An apparatus comprising:
   a pair of frame plates spaced apart from one another;
   a pair of lever arms spaced apart from one another and operative to pivot relative to the pair of frame plates about a pivot axis;
   a linkage assembly pivotally coupled to the pair of frame plates and to the pair of lever arms;
   a pair of bridge arms spaced apart from one another and pivotally coupled to the pair of lever arms;
   a pair of upper pad assemblies pivotally coupled to the pair of bridge arms; and
   a pair of lower pad assemblies pivotally coupled to the pair of frame plates;
   wherein pivoting the pair of lever arms in a first direction about the pivot axis translates the pair of upper pad assemblies towards the pair of lower pad assemblies, and pivoting the pair of lever arms in a second direction about the pivot axis translates the pair of upper pad assemblies away from the pair of lower pad assemblies;
   wherein actuation of the linkage assembly is operative to cause the pair of lever arms to pivot about the pivot axis.

2. The apparatus of claim 1, wherein:
   each of the pair of lever arms defines a respective proximal end and a respective distal end;
   the linkage assembly is pivotally coupled to the pair of lever arms proximate to the proximal ends of the pair of lever arms; and
   the pair of bridge arms are pivotally coupled to the pair of lever arms proximate to the distal ends of the pair of lever arms.

3. The apparatus of claim 1, wherein the pivot axis is displaced from the pair of frame plates and does not extend therethrough.

4. The apparatus of claim 1, further comprising:
   an upper block at least partially disposed between the pair of frame plates;
   an eyebolt screwed into the upper block; and
   an elongate member passing through the pair of lever arms and the eyebolt along the pivot axis.

5. The apparatus of claim 1, further comprising:
   a first elongate member spanning between the pair of lever arms;
   a second elongate member spanning between the pair of frame plates; and
   a spring spanning between the first elongate member and the second elongate member.

6. The apparatus of claim 5, wherein the spring urges the first elongate member towards the second elongate member.

7. The apparatus of claim 1, wherein the pair of lower pad assemblies are translatably coupled to the pair of frame plates.

8. The apparatus of claim 1, wherein:
   a lower pad assembly of the pair of lower pad assemblies defines a slotted opening; and
   the apparatus further comprises an elongate member passing through the pair of frame plates and the slotted opening.

9. The apparatus of claim 1, further comprising an elongate member passing through the pair of bridge arms and the pair of lever arms.

10. The apparatus of claim 9, wherein the elongate member comprises a bolt, a pin, or a rod.

11. The apparatus of claim 1, wherein the pair of upper pad assemblies are translatably coupled to the pair of bridge arms.

12. The apparatus of claim 1, wherein:
  an upper pad assembly of the pair of upper pad assemblies defines a slotted opening; and
  the apparatus further comprises an elongate member passing through the pair of bridge arms and the slotted opening.

13. The apparatus of claim 1, further comprising:
  an elongate member spanning between the pair of lever arms; and
  a spring spanning between an upper pad assembly of the pair of upper pad assemblies and the elongate member.

14. The apparatus of claim 1, further comprising:
  an elongate member spanning between the pair of bridge arms; and
  a spring spanning between an upper pad assembly of the pair of upper pad assemblies and the elongate member.

15. The apparatus of claim 1, wherein the apparatus is operative to clamp an object between the pair of upper pad assemblies and the pair of lower pad assemblies.

16. The apparatus of claim 15, wherein the object comprises a helicopter rotor blade.

17. The apparatus of claim 15, wherein the linkage assembly comprises:
  a pair of clamp lever arms spaced apart from one another and pivotally coupled to the pair of lever arms; and
  a pivot plate pivotally coupled to the pair of frame plates and to the pair of clamp lever arms.

18. The apparatus of claim 17, wherein:
  the pivot plate is pivotally coupled to the pair of frame plates about a first pivot axis and is pivotally coupled to the pair of clamp lever arms about a second pivot axis;
  the pair of clamp lever arms are pivotally coupled to the pair of lever arms about a third pivot axis; and
  causing the second pivot axis to pass a line extending between the first pivot axis and the third pivot axis positively locks positions of the pair of upper pad assemblies relative to the pair of lower pad assemblies with the object clamped therebetween.

19. The apparatus of claim 1, further comprising a threaded receiver.

20. The apparatus of claim 19, further comprising a pole or strap attached to the threaded receiver.

* * * * *